C. H. KÖHN.
MOTOR PLOW.
APPLICATION FILED OCT. 17, 1913.

1,221,458.

Patented Apr. 3, 1917.
4 SHEETS—SHEET 1.

Witnesses:
Alfred R. Anderson
John H. Hoving

Inventor
C. H. Köhn
By H van Dedeurnef
Attorney

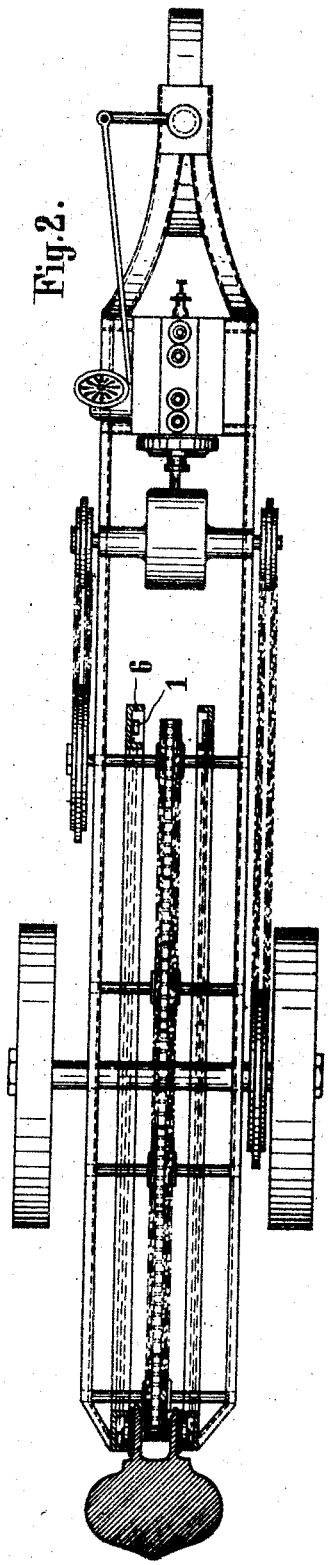

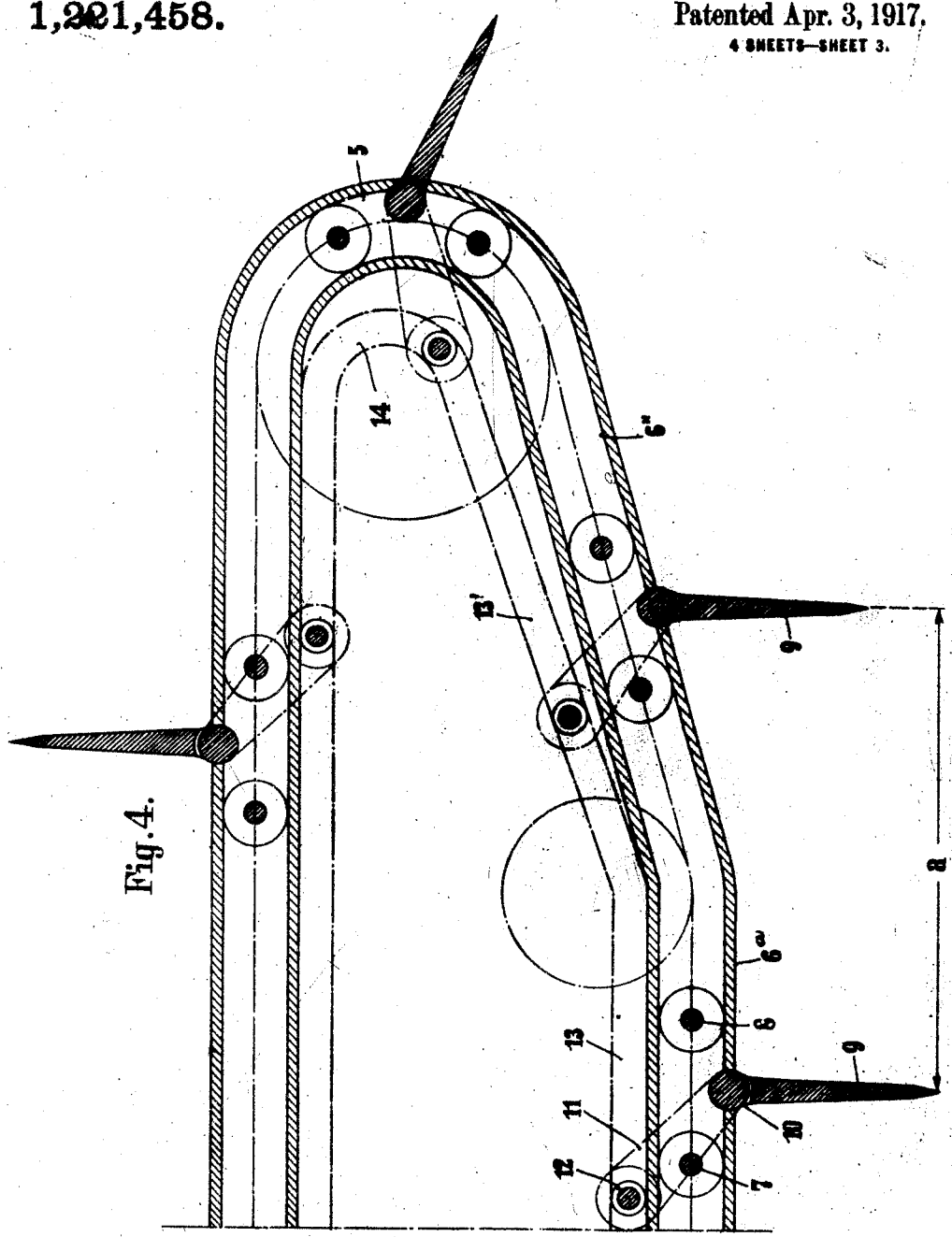

C. H. KÖHN.
MOTOR PLOW.
APPLICATION FILED OCT. 17, 1913.

1,221,458.

Patented Apr. 3, 1917.
4 SHEETS—SHEET 4.

Witnesses:
Alfred R. Anderson
John H. Hoving

Inventor:
C. H. Köhn
By H. van Dedemvael
Attorney

UNITED STATES PATENT OFFICE.

CLAUS HINRICH KÖHN, OF LEIPZIG, GERMANY, ASSIGNOR TO M. BROCKMANN, CHEMISCHE FABRIK M. B. H., OF LEIPZIG-EUTRITZSCH, GERMANY, A CORPORATION OF GERMANY.

MOTOR-PLOW.

1,221,458. Specification of Letters Patent. Patented Apr. 3, 1917.

Application filed October 17, 1913. Serial No. 795,695.

*To all whom it may concern:*

Be it known that I, CLAUS HINRICH KÖHN, a citizen of the German Empire, and residing at Leipzig, Germany, have invented certain new and useful Improvements in Motor-Plows, of which the following is a specification.

In the United States Patent No. 992211, a motor plow is described in which anchors are rotated by means of chains in a frame which is used for pulling the plow; the anchors enter into the ground in the working position, and the frame is driven forward along these anchors which are repeatedly withdrawn from and driven into the ground.

In machines of this type, however, it has been found that when pulling the anchors out of the ground in their end position earth is brought up with them which falls back on to the heads of the anchors and the driving chain when the anchors move with the upper side of the chain, whereby these driving parts are soiled and subjected to rapid wear and tear.

A primary object of my invention is to provide a modification of the motor plow of the type described such that the raising of earth is avoided as much as possible and that the anchors are inserted straight into and withdrawn straight from the ground, and, further, that the driving chains are protected from any earth which is nevertheless carried up by the anchors and falls off therefrom when they move with the upper side of the chain.

These ends are in part attained by means of specially designed guides for the anchors such that the latter are inserted into and withdrawn from the ground exactly vertically and that the distance between their flukes while in the ground remains constant, so that they do not unnecessarily compress the ground. Further, the driving chains for the heads of the anchors are completely covered over either by belts, bands or the like, or by suitably shaping the guides for the anchors.

Several illustrative embodiments of the invention are diagrammatically represented by way of example in the accompanying drawings, wherein:—

Figure 1:
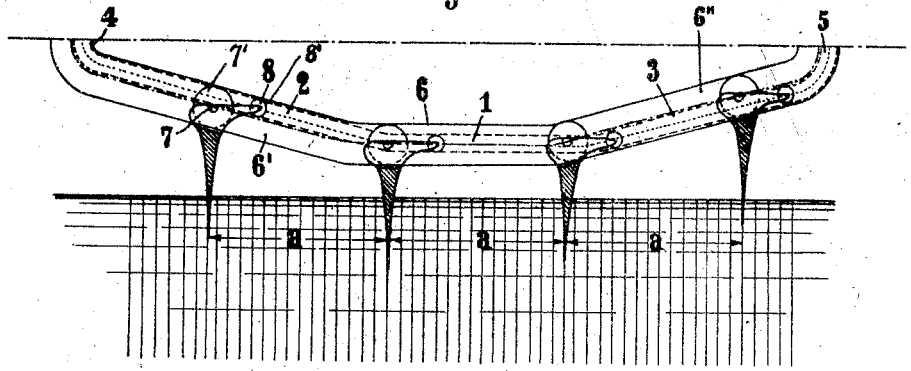
Figure 3:
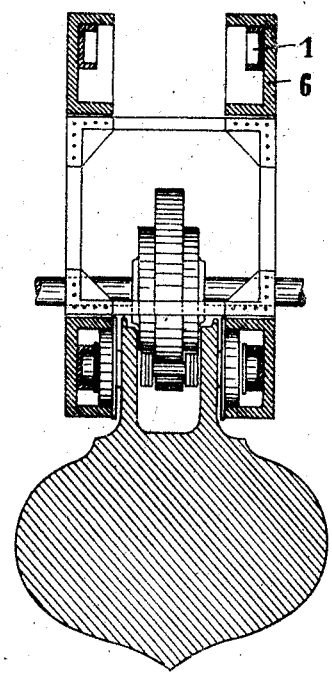
Figure 5:
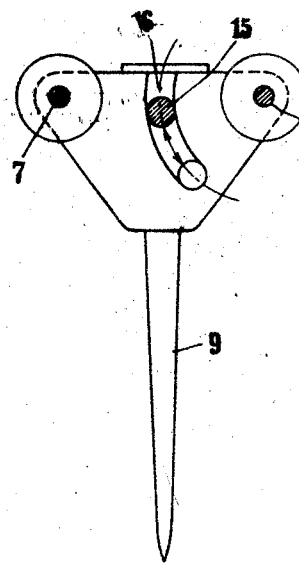

Figure 1 is an elevation showing the lower portion of a guide-way for the anchors, the front and rear rollers of the heads of the anchors being guided in separate guides of suitable design, such that the anchors are inserted into and withdrawn from the ground in a vertical or an approximately vertical position, Fig. 2 is a top plan view of a machine comprising guide-ways shown in Fig. 1, and Fig. 3 is a cross-section taken through the guide-ways and through an anchor;

Fig. 4 is a sectional elevation showing a second form of guide-way and anchor; these anchors are also inserted into the ground vertically, and the distance between their flukes in the ground is kept constant; and Fig. 5 is an elevation showing the mode of connection of the anchor head with the driving chain for the purpose of enabling those relative displacements to take place between the chain and the anchor heads which occur owing to the sag of the chain.

Figure 6:
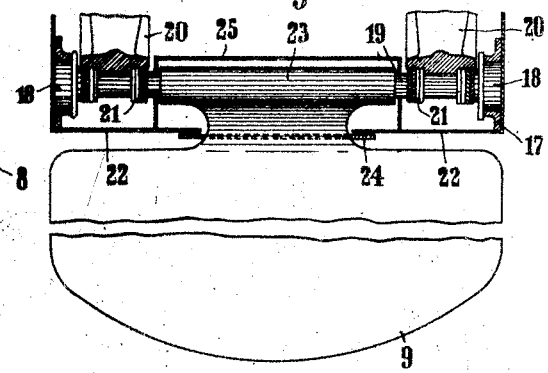

Fig. 6 is a cross-section taken through an anchor and its guide-ways showing covers or guards for driving chains on either side of the anchor.

In the embodiment according to Figs. 1 to 3, separate guides 1, 6 are provided for the front and rear axles 7, 8 of the heads of the anchors, such that from the moment when the anchors bear on the ground to the moment when the same enter into and are removed from it they are guided vertically or approximately vertically, and the distance apart of their flukes 9 measured in a horizontal plane remains constant, so that it is impossible for the ground to be compressed between them. In Fig. 1 the numeral 1 designates the improved guide-way for the anti-friction rollers 8' carried by the rear axles 8 of the heads of the anchors, 6 designates the improved guide-way for the anti-friction rollers 7' carried by the front axles 7 of the same, and 2 and 3 designate the slightly slanting portions of the guide-way for the rear axles which respectively run into the curved portions 4 and 5 thereof, which insure that the anchors are gradually inserted into the ground in an approximately vertical position. Corresponding to the portions 2 and 3 of the guide-way 1, portions 6', 6'' of the guide-way 6 for the front axles run relatively to the said portions 2 and 3 in such manner that the flukes 9 of the anchors move horizontally at the same distance apart, i. e. the distance a in Fig. 1, from the moment of their insertion into, until the moment of their withdrawal from the ground, whereby the earth is prevented from being compressed.

Figs. 4 and 5 show another embodiment, in which the anchors are gradually introduced vertically and at equal distances apart into the ground by means of two guide-ways. In this embodiment 6ª designates the guide-way for both the front axles 7 and the rear axles 8 of the head of the anchor; this guide-way has the slightly curved portions 6″ running into the circular portions 5. The flukes 9 are not attached rigidly to the heads of the anchors, but are mounted to swing about pivots 10. On each pivot 10 is keyed one end of an arm 11 whose other end is guided by means of an anti-friction roller 12 in a separate guide-way 13 which has curved portions 14 and slightly inclined portions 13′ such that the fluke 9 is slowly and automatically inserted and withdrawn from the ground while the horizontal distance a between the points of two anchors in the ground is kept constant.

Fig. 5 shows how the fixed pivot takes into the head of the anchor. As the chain sags it is never located exactly parallel with either guide-way, and consequently it must be able to shift vertically relatively to the head of the anchor. It can do so owing to the fixed pivot 15 taking into a slot 16 in the head of the anchor.

The chain and the guide-ways can be covered over and thereby protected in various ways from any soil which, in spite of the anchors being guided vertically, is carried up by them and falls down; for example, fixed cheeks, flanges, side pieces, or belts rotating with the anchors, plates and the like may be provided.

In the embodiment shown in Fig. 6 the numeral 17 designates the guide-ways for the rollers 18 of the anchor axles 19. These axles are driven on both sides by the sprocket-wheels 20 by means of the chains 21. These chains are completely covered by the fixed plates 22 and shut off from the anchors 9, so that any soil falling off the flukes falls on to the plates 22 and cannot fall on to the chains. For this purpose the shank of the anchor is reduced in breadth, i. e. constricted, in proximity to its head 23, up to which the plates 22 extend or nearly so. In order to obtain a perfectly tight joint between the plates 22 and the anchors I may arrange at the constriction in the shank a rotating belt or band 24 which closes the gap between the anchors and the plates 22. Also, in order to prevent the sprocket-wheels 20 becoming soiled it is preferable to protect them in addition by means of plates 25.

I claim:—

1. In a car for driving a plow, the combination with a frame, sprocket-wheels mounted therein, an endless chain meshing with the sprocket-wheels, and a plurality of anchors having blade like flukes and driven by the chain, of endless guide-ways in the frame, a plurality of members guided in one of the guide-ways, and a plurality of members guided in the other guide-way, each anchor being operatively connected with one of the former members and with one of the latter members, said members and guide ways coöperating to constrain said flukes to remain substantially vertical when entering and leaving the soil.

2. In a car for driving a plow, the combination with a frame, sprocket-wheels mounted therein, an endless chain meshing with the sprocket-wheels, and a plurality of anchors having blade like flukes and driven by the chain, of two pairs of endless guide-ways in the frame, a front axle and a rear axle carried by each anchor, rollers carried by each front axle and guided in one pair of guide-ways, and rollers carried by each rear axle and guided in the other pair of guide-ways, said rollers and guide ways coöperating to constrain said flukes to remain substantially vertical when entering and leaving the soil.

3. In a car for driving a plow, the combination with a frame, sprocket-wheels mounted therein, an endless chain meshing with the sprocket-wheels, and a plurality of anchors having blade like flukes and driven by the chain, of endless guide-ways in the frame, a plurality of members guided in one of the guide-ways, and a plurality of members guided in the other guide-way, each anchor being operatively connected with one of the former members and with one of the latter members, each guide-way having two end portions of short radius running into curved portions of long radius connected by rectilinear portions such that from the time the anchors bear on the ground until their withdrawal from the same, the horizontal distance between two flukes remains constant and the anchors enter into and are withdrawn from the ground in an approximately vertical direction, said members and guide ways coöperating to constrain said flukes to remain substantially vertical when entering and leaving the soil.

4. In a car for driving a plow, the combination with a frame, sprocket-wheels mounted therein, an endless chain meshing with the sprocket-wheels, and a plurality of anchors having blade like flukes and driven by the chain, of endless guide-ways in the frame, a plurality of members guided in one of the guide-ways, and a plurality of members guided in the other guide-way, each anchor being carried and guided by two of the former members and guided by one of the latter members, said members and guide ways coöperating to constrain said flukes to remain substantially vertical when entering and leaving the soil.

5. In a car for driving a plow, the combination with a frame, sprocket-wheels mounted therein, an endless chain meshing with the sprocket-wheels, and a plurality of anchors having blade like flukes and driven by the chain, of endless guide-ways in the frame, a plurality of pairs of axles each carrying an anchor guided in a pair of said guide-ways, and each anchor having an arm guided in another of said guide-ways.

6. In a car for driving a plow, the combination with a frame, sprocket-wheels mounted therein, and an endless chain meshing with the sprocket-wheels, of endless guide-ways in the frame, and a plurality of anchors having blade like flukes and each comprising a slotted head, a fluke pivotally connected thereto and an arm rigidly attached to the fluke; each head being guided in a pair of said guide-ways, and each arm being guided in another of said guide-ways, and each pin of the chain taking into a slot in a head, heads, arms and guide ways coöperating to constrain said flukes to remain substantially vertical when entering and leaving the soil.

7. In a car for driving a plow, the combination with a frame, sprocket-wheels mounted therein, an endless chain meshing with the sprocket-wheels, and a plurality of anchors having blade like flukes and driven by the chain, of two pairs of endless guide-ways in the frame, a front axle and a rear axle carried by each anchor, rollers carried by each front axle and guided in one pair of guide-ways, and rollers carried by each rear axle and guided in the other pair of guide-ways, one pair of guide-ways being located in the other pair, said members and guide ways coöperating to constrain said flukes to remain substantially vertical when entering and leaving the soil.

8. In a car for driving a plow, the combination with a frame, sprocket-wheels mounted therein, an endless chain meshing with the sprocket-wheels, and a plurality of anchors having blade like flukes and driven by the chain, of endless guide-ways in the frame, a plurality of members guided in one of the guide-ways, and a plurality of members guided in the other guide-way, each anchor being operatively connected with one of the former members and with one of the latter members; and means for protecting the chain from soil thrown up by, and falling off the anchors, said members and guide ways coöperating to constrain said flukes to remain substantially vertical when entering and leaving the soil.

9. In a car for driving a plow, the combination with a frame, sprocket-wheels mounted therein, an endless chain meshing with the sprocket-wheels, and a plurality of anchors having blade like flukes and driven by the chain, of two pairs of endless guide-ways in the frame, a front axle and a rear axle carried by each anchor, rollers carried by each front axle, and guided in one pair of guide-ways, and rollers carried by each rear axle and guided in the other pair of guide-ways, one of the pair of guide-ways having portions thereof constituting guards for the members guided thereby and for the chain, said rollers and guide ways coöperating to constrain said flukes to remain substantially vertical when entering and leaving the soil.

10. In a car for driving a plow, the combination with a frame, sprocket-wheels mounted therein, an endless chain meshing with the sprocket-wheels, and a plurality of anchors having blade like flukes and driven by the chain, of endless guide-ways in the frame, a plurality of members guided in one of the guideways, and a plurality of members guided in the other guide-way, each anchor being operatively connected with one of the former members and with one of the latter members; and means movable with the anchors for protecting the chain from soil thrown up by, and falling off the anchors, said members and guide ways coöperating to constrain said flukes to remain substantially vertical when entering and leaving the soil.

11. In a car for driving a plow, the combination of a frame, sprocket-wheels mounted therein, two pairs of endless guide-ways in the frame, a plurality of members guided in one pair of guide-ways, a plurality of members guided in the other pair of guide-ways, anchors having blade like flukes and carried by said members, and chains meshing with said sprocket-wheels, each anchor having a constriction in the shank thereof, and plates carried by one pair of guide-ways extending into the constrictions in the anchors, said members and guide ways coöperating to constrain said flukes to remain substantially vertical when entering and leaving the soil.

12. In a car for driving a plow, the combination of a frame, sprocket-wheels mounted therein, two pairs of endless guide-ways in the frame, a plurality of members guided in one pair of guide-ways, a plurality of members guided in the other pair of guide-ways, anchors having blade like flukes and carried by said members, and chains meshing with said sprocket-wheels, each anchor having a constriction in the shank thereof, and plates carried by one pair of guide-ways extending into the constrictions in the anchors, and a band carried by the anchors for closing the gap between the said plates and the anchors, said members and guide ways coöperating to constrain said flukes to remain substantially vertical when entering and leaving the soil.

13. In a car for driving a plow, the combination of a frame; endless guideways on said frame; a plurality of roller members adapted to move in said guideways and each held against substantial transverse play in a vertical plane therein; anchors pivotally connected to members and each comprising a blade like fluke and an arm angularly disposed to the plane of the fluke; a roller member on said arm and another endless guide adapted to receive said member and hold it against substantial transverse play therein, said guide being shaped in such a way as to hold said flukes in substantially vertical position when approaching and leaving their lowermost positions.

14. In a car for driving a plow, the combination of a frame; endless guideways on said frame; a plurality of members adapted to move in said guideways and each held against substantial transverse play in a vertical plane therein; anchors pivotally connected to members and each comprising a blade like fluke and an arm angularly disposed to the plane of the fluke; a member on said arm and another endless guide adapted to receive said member and hold it against substantial transverse play therein, said guide being shaped in such a way as to hold said flukes in substantially vertical position when approaching and leaving their lowermost positions.

15. In a tractor, the combination, with the frame of the tractor, of driving flukes adapted to move into and out of the ground and to move horizontally relatively to the tractor; and means for constraining said flukes to remain vertical the whole time that they are in the ground or partially in the ground and during all vertical movement either up or down while they are in the ground.

16. In a tractor, the combination, with the frame of the tractor, of driving flukes adapted to move into and out of the ground and to move horizontally relatively to the tractor; and means for constraining said flukes to remain vertical the whole time that they are in the ground or partially in the ground and during all vertical movement either up or down while they are in the ground, and to constrain said flukes to remain equidistant during their contact with the ground to avoid compression of the soil therebetween.

17. A tractor comprising anchor heads each having an anchor fluke and a front and a rear axle; separate closed guide ways for each axle, guiding the respective axles on both sides whereby the anchor flukes are locked in both directions; endless chains for propelling the anchor heads; said guide ways being so curved that the points of the respective anchor flukes are substantially equidistant during their contact with the ground, to avoid compression of the soil between the flukes.

18. A tractor comprising a plurality of anchor heads each having flukes and an arm; endless guide ways; carriers in said guide way, carrying said heads; a roller on the end of said arm; and an additional guide way engaging said roller on both sides and having such a shape that the anchor flukes are constrained to engage the soil substantially equidistntly and vertically.

19. A tractor comprising a plurality of anchor heads; endless guide ways; carriers in said guide ways, supporting said heads and provided with slots; means for holding the anchor flukes substantially vertically while engaging the soil; an endless chain drive; and means carried on the drive chain and engaging in said slots for driving the carriers.

In testimony whereof, I affix my signature in the presence of two witnesses.

CLAUS HINRICH KÖHN.

Witnesses:
 RUDOLPH FRICKE,
 DORIS KRAHL.